(12) United States Patent
Chan et al.

(10) Patent No.: US 9,297,970 B1
(45) Date of Patent: Mar. 29, 2016

(54) LOW COST, CONNECTORLESS, RUGGEDIZED SMALL FORM FACTOR OPTICAL SUB-ASSEMBLY (OSA) AND DATA BUS-IN-A-BOX (BIB)

(71) Applicant: THE BOEING COMPANY, Chicago, IL (US)

(72) Inventors: Eric Y. Chan, Chicago, IL (US); Tuong K. Truong, Chicago, IL (US); Dennis G. Koshinz, Chicago, IL (US); Henry B. Pang, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/533,715

(22) Filed: Nov. 5, 2014

(51) Int. Cl.
| | |
|---|---|
| *G02B 6/32* | (2006.01) |
| *G02B 6/42* | (2006.01) |
| *G02B 6/245* | (2006.01) |
| *B32B 37/18* | (2006.01) |
| *B32B 37/14* | (2006.01) |
| *B32B 37/12* | (2006.01) |
| *B32B 38/00* | (2006.01) |
| *B32B 38/10* | (2006.01) |

(52) U.S. Cl.
CPC .......... *G02B 6/4253* (2013.01); *B32B 37/1284* (2013.01); *B32B 37/142* (2013.01); *B32B 37/18* (2013.01); *B32B 38/0004* (2013.01); *B32B 38/10* (2013.01); *G02B 6/245* (2013.01); *G02B 6/32* (2013.01); *G02B 6/428* (2013.01); *G02B 6/4255* (2013.01); *G02B 6/4257* (2013.01); *G02B 6/4263* (2013.01); *G02B 6/4277* (2013.01); *B32B 2307/40* (2013.01); *B32B 2457/00* (2013.01); *B32B 2551/00* (2013.01)

(58) Field of Classification Search
CPC ...... G02B 6/32; G02B 6/4206; G02B 6/4214; G02B 6/4204; G02B 6/4249
USPC .......................................... 385/15, 31, 33, 39
See application file for complete search history.

(56) References Cited

U.S. PATENT DOCUMENTS

| | | | | |
|---|---|---|---|---|
| 7,023,705 | B2 * | 4/2006 | Liu ...................... | G02B 6/4201 361/760 |
| 7,358,109 | B2 * | 4/2008 | Gallup .................... | H01S 5/423 257/E33.056 |
| 8,478,127 | B2 | 7/2013 | Chan et al. | |

OTHER PUBLICATIONS

Concept Overdrive Fiber-Serial Board, available at http://www.conceptoverdrive.com/products/fiber_serial.php, available on Oct. 23, 2013.
Avago Technologies Fiber Optic Transmitter and Receiver for 1 mm POF, available at http://mouser.com/ds/2/38/AV02-3690EN+DS+AFBR-1644Z+29Jun2012-216547.pdf, available on Jun. 29, 2012.

\* cited by examiner

*Primary Examiner* — Jennifer Doan
(74) *Attorney, Agent, or Firm* — Vista IP Law Group LLP; Cynthia A. Dixon

(57) ABSTRACT

Systems, methods, and apparatus for an optical sub-assembly (OSA) are disclosed. In one or more embodiments, the disclosed apparatus involves a package body, and a lock nut, where a first end of the lock nut inserted into a first cavity of the package body. The apparatus further involves a transistor outline (TO) can, where a first end of the TO can is inserted into a second cavity of the package body. Also, the apparatus involves an optical fiber, where a portion of the jacket from an end of the optical fiber is stripped off, thereby exposing bare optical fiber at the end of the optical fiber. The end of the optical fiber is inserted into a second end of the lock nut such that the bare optical fiber passes into the package body and at least a portion of the bare optical fiber is inserted into the TO can cavity.

20 Claims, 16 Drawing Sheets

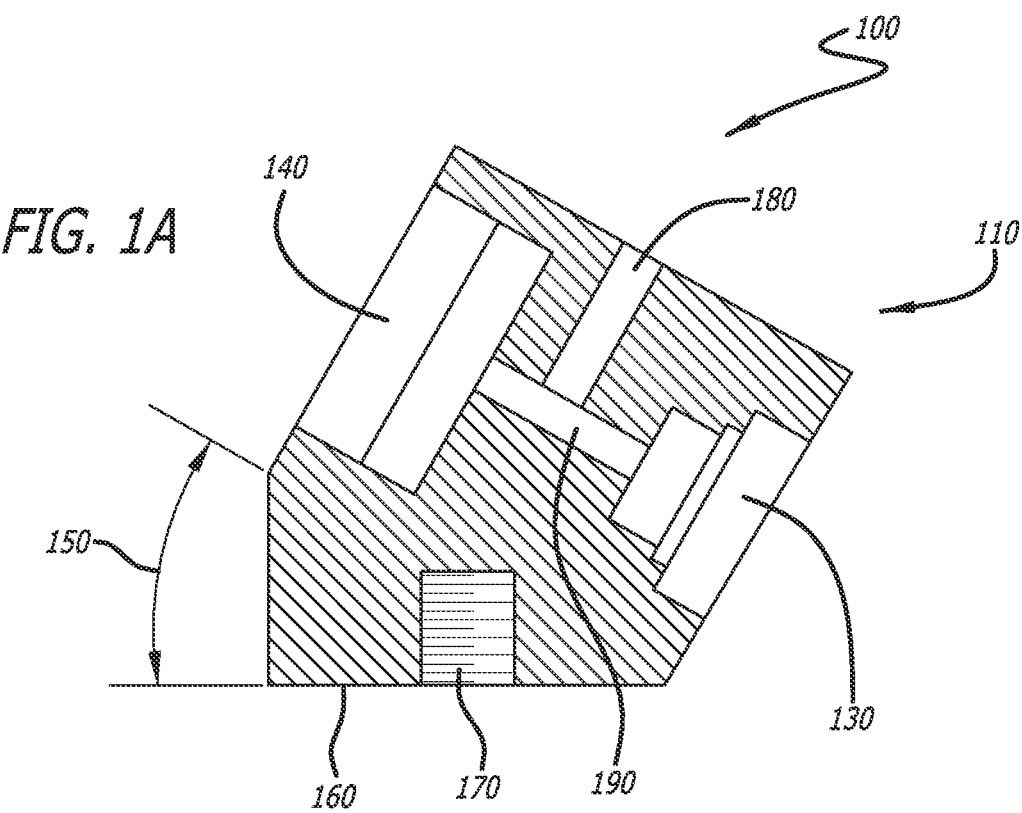
FIG. 1A
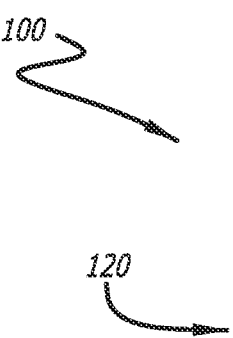
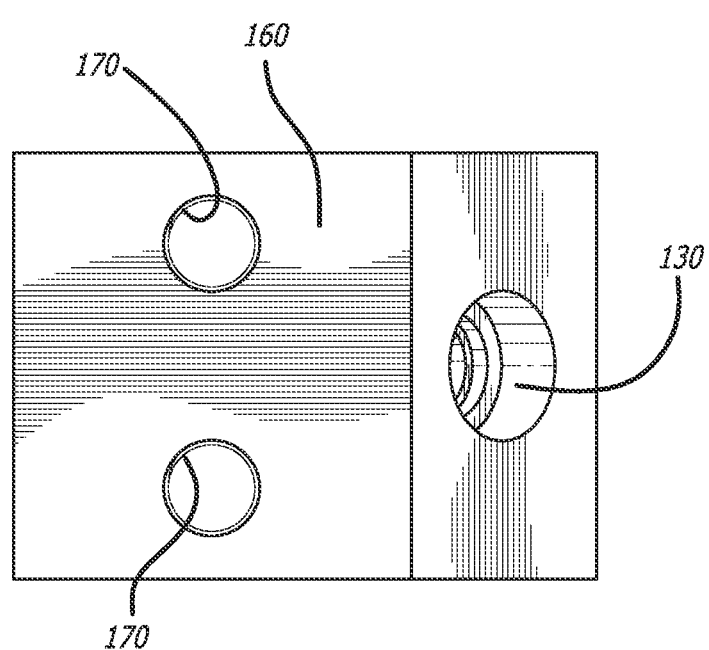
FIG. 1B

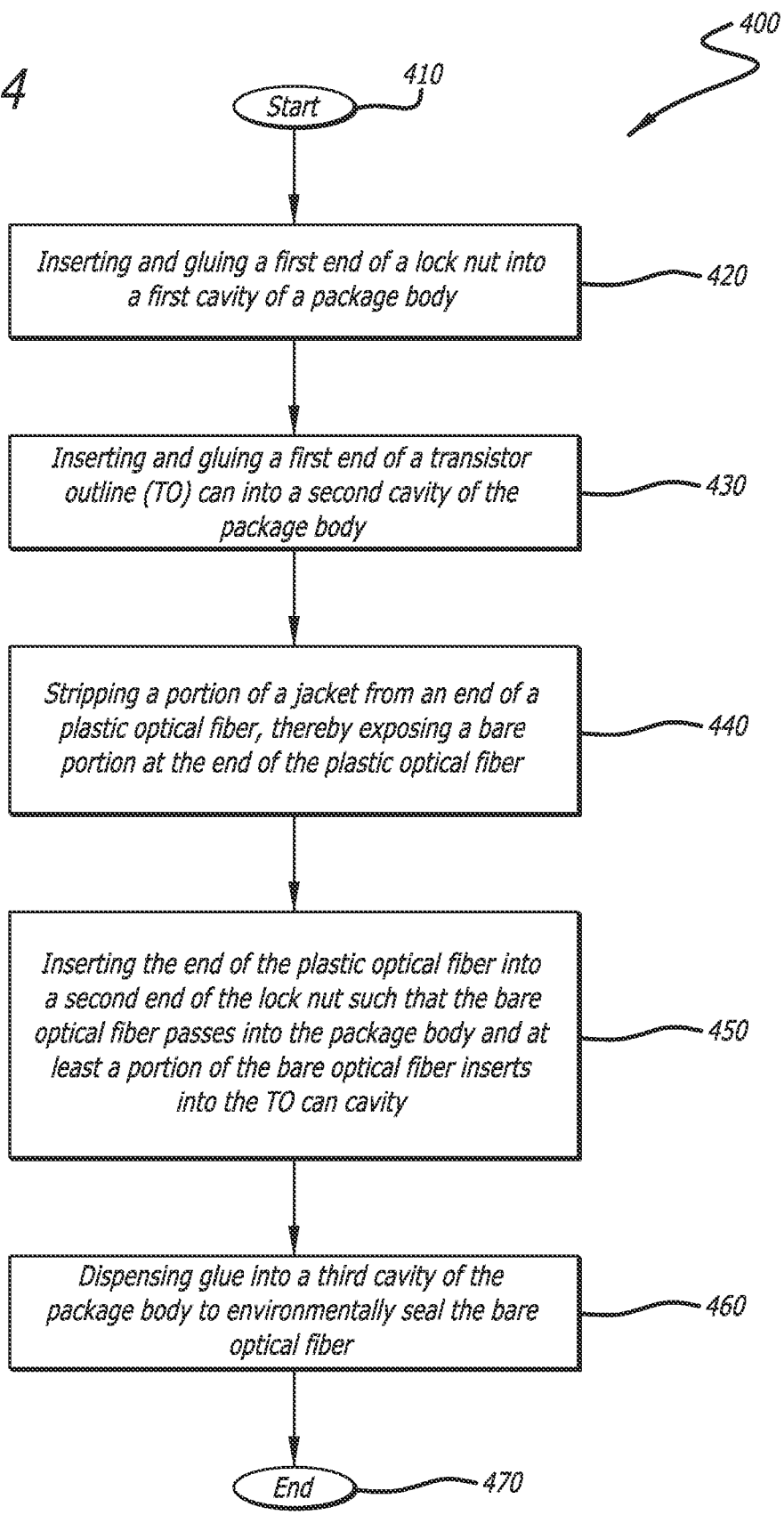

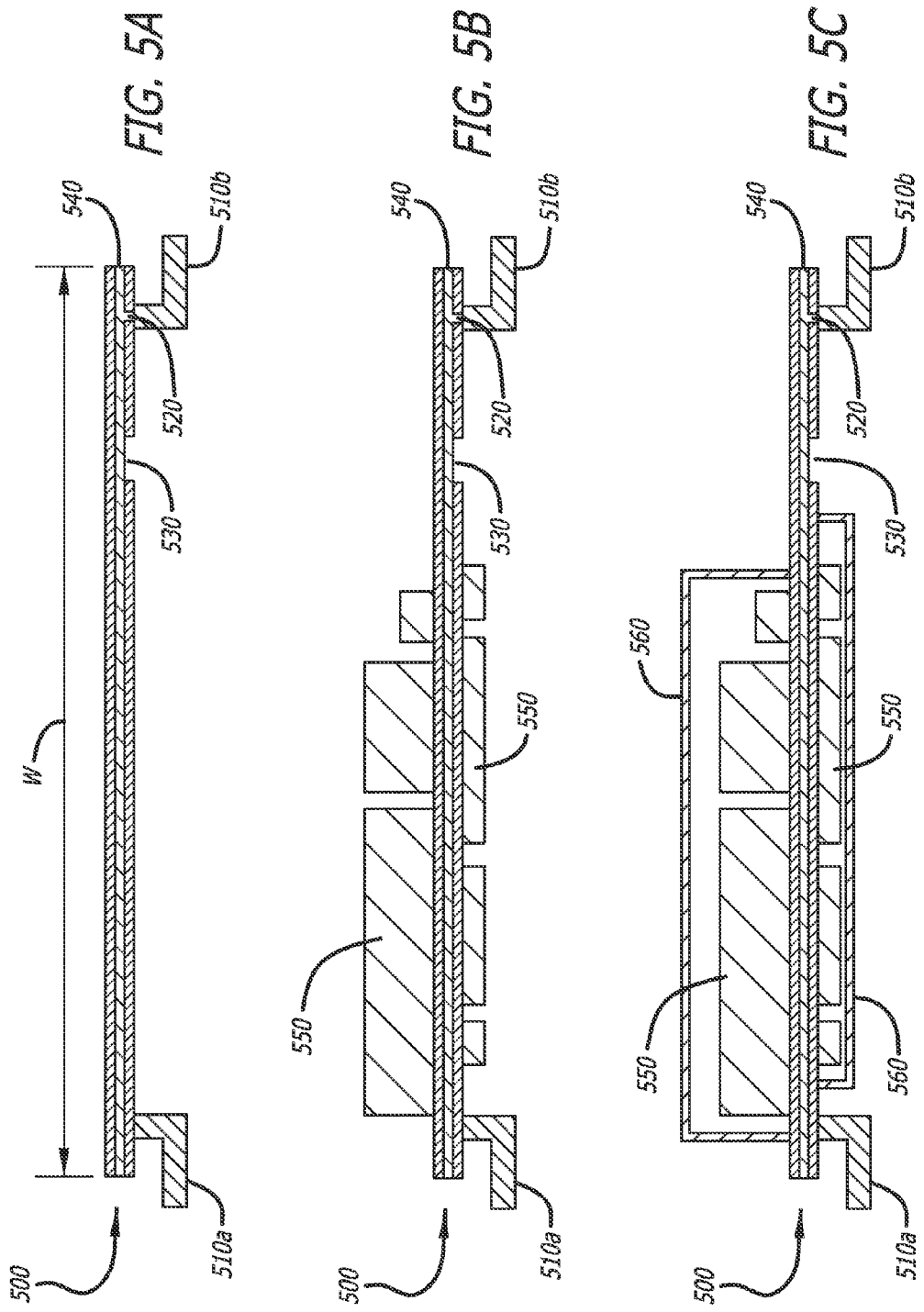

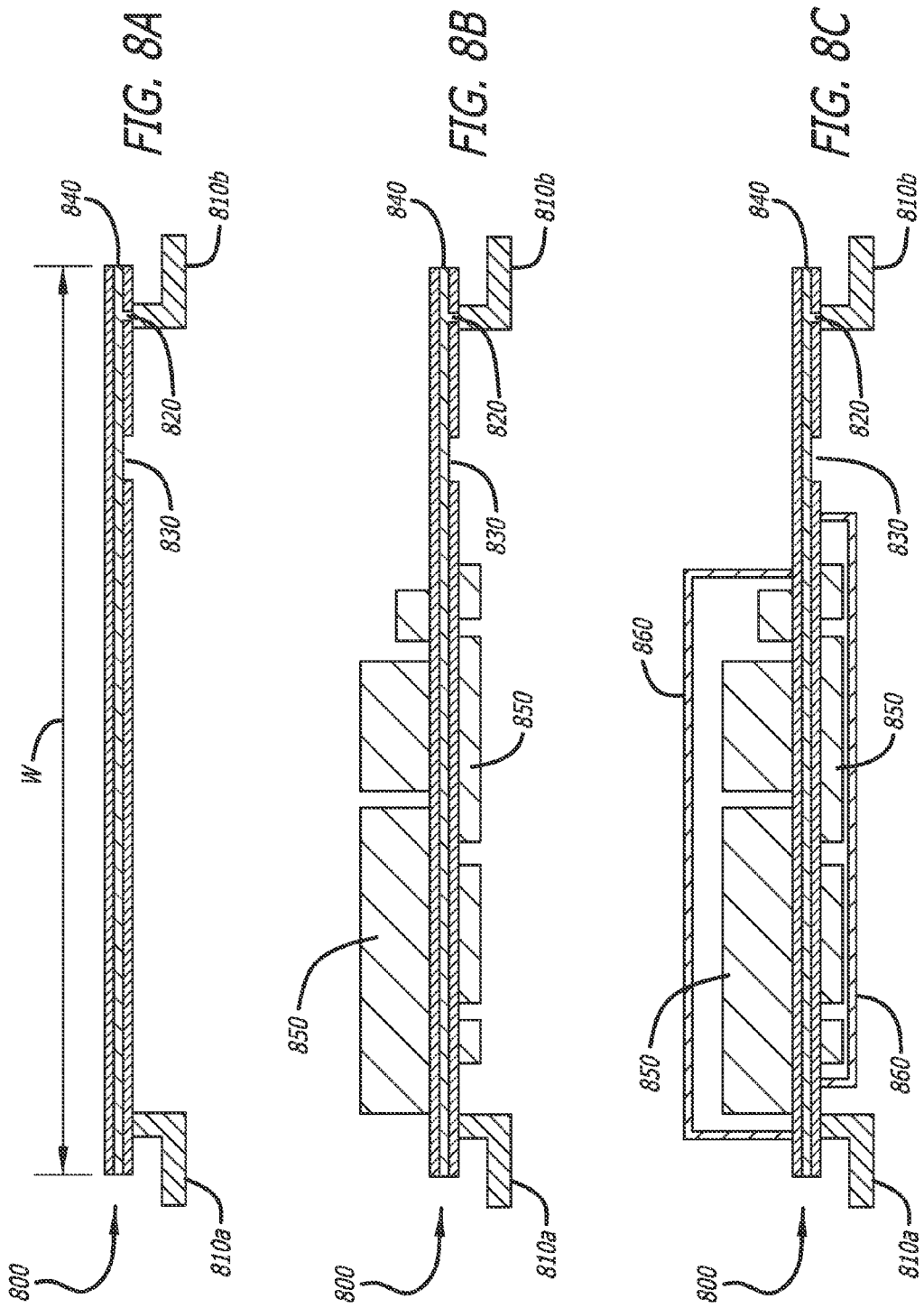

LOW COST, CONNECTORLESS, RUGGEDIZED SMALL FORM FACTOR OPTICAL SUB-ASSEMBLY (OSA) AND DATA BUS-IN-A-BOX (BIB)

CROSS-REFERENCE TO RELATED APPLICATION

This application is related to U.S. patent application Ser. No. 14/533,865, filed Nov. 5, 2014, titled Data Bus-in-a-Box (BiB) System Design and Implementation, by Chan, et al.

FIELD

The present disclosure relates to optical sub-assemblies and data buses. In particular, it relates to a low cost, connectorless, ruggedized small form factor optical sub-assembly (OSA) and data bus-in-a-box (BiB) design and assembly process.

BACKGROUND

Currently, some system data bus architectures (e.g., an ARINC plastic optical fiber (POF) 629 data bus) employed in aircraft (e.g., a modern aircraft) require an individually packaged optical media converter (OMC) for each channel. They also require individually packaged passive optical star couplers. These individually packaged units are interconnected together by fully jacketed aircraft POF cables that are subjected to abuse during installation. The connectors required for these packages are not only heavy, bulky, and costly, but also add significant optical attenuation to the system's optical power budget. The optical media converters (OMCs) and optical star couplers also require custom designed support brackets and rails to mount them to the aircraft structure members. Each OMC (which contains a transmit (Tx) optical sub-assembly (OSA) and a receive (Rx) OSA) and optical star coupler must be manufactured and tested individually, thereby incurring much more time and cost. When an OMC fails, an aircraft mechanic must remove it and install a new OMC in its place, which requires additional time and cost. As such, there is a need for an improved data bus architecture design.

SUMMARY

The present disclosure relates to a method, system, and apparatus for an optical sub-assembly (OSA), which may be employed in the disclosed data BiB design. In one or more embodiments, a method for manufacturing an optical sub-assembly (OSA) involves inserting a first end of a lock nut into a first cavity of a package body. The method further involves inserting a first end of a transistor outline (TO) can into a second cavity of the package body. Also, the method involves stripping a portion of a jacket from an end of an optical fiber (e.g., a plastic optical fiber (POF)), thereby exposing bare optical fiber at the end of the optical fiber. Additionally, the method involves inserting the end of the optical fiber into a second end of the lock nut such that the bare optical fiber passes into the package body and at least a portion of the bare optical fiber inserts into a cavity of the TO can. Further, the method involves dispensing glue into a third cavity of the package body to environmentally seal the bare portion of the optical fiber.

In one or more embodiments, the TO can is a hermetically sealed TO can.

In at least one embodiment, the TO can comprises a lens.

In one or more embodiments, the OSA is tilted approximately thirty (30) degrees from a plane of a mounting surface for the OSA.

In at least one embodiment, the method further involves securing, with at least one screw, a bottom side of the OSA to a mounting surface of a board by applying the screw(s) through an opening in the board into a mounting screw hole on the bottom side of the OSA, thereby mounting the OSA to the board.

In one or more embodiments, the board is an optical media converter (OMC) printed circuit board (PCB).

In at least one embodiment, the OSA is an optical transmitter. In some other embodiments, the OSA is an optical receiver.

In one or more embodiments, the optical fiber (e.g., plastic optical fiber), including the jacket, has a typical diameter of approximately 2.2 millimeter (mm), and a diameter size down to approximately 1.5 mm is acceptable (i.e. the diameter ranges from approximately 1.5 mm to approximately 2.2 mm). In some embodiments, the bare optical fiber (e.g., plastic optical fiber), without the jacket, has a diameter of approximately 1 millimeter (mm).

In at least one embodiment, the glue is a military specification (mil-spec) grade epoxy.

In one or more embodiments, the method further involves dispensing glue into the second end of the lock nut to secure the lock nut to the package body.

In at least one embodiment, the method further involves manufacturing the package body by molding the package body from a cool polymer material.

In one or more embodiments, an apparatus for an optical sub-assembly (OSA) involves a package body; and a lock nut, where a first end of the lock nut is inserted into a first cavity of the package body. The apparatus further involves a transistor outline (TO) can, where a first end of the TO can is inserted into a second cavity of the package body. Also, the apparatus involves an optical fiber (e.g., a plastic optical fiber), where a portion of a jacket from an end of the optical fiber is stripped off, thereby exposing bare optical fiber at the end of the optical fiber. In one or more embodiments, the end of the optical fiber is inserted into a second end of the lock nut such that the bare optical fiber passes into the package body and at least a portion of the bare optical fiber is inserted into a cavity of the TO can. In at least one embodiment, glue is dispensed (e.g., inserted) into a third cavity of the package body, thereby environmentally sealing the bare optical fiber (e.g., the plastic optical fiber).

In at least one embodiment, the TO can is hermetically sealed.

In one or more embodiments, the package body is manufactured from a molded cool polymer material.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIGS. 1A and 1B are diagrams showing the disclosed optical sub-assembly (OSA) package body, in accordance with at least one embodiment of the present disclosure.

FIG. 4 is a flow chart of the disclosed method for manufacturing an OSA, in accordance with at least one embodiment of the present disclosure.

FIGS. 5A, 5B, and 5C are diagrams illustrating the transmit (Tx) optical media converter (OMC) printed circuit board (PCB) design and assembly process, in accordance with at least one embodiment of the present disclosure.

Figure 6:
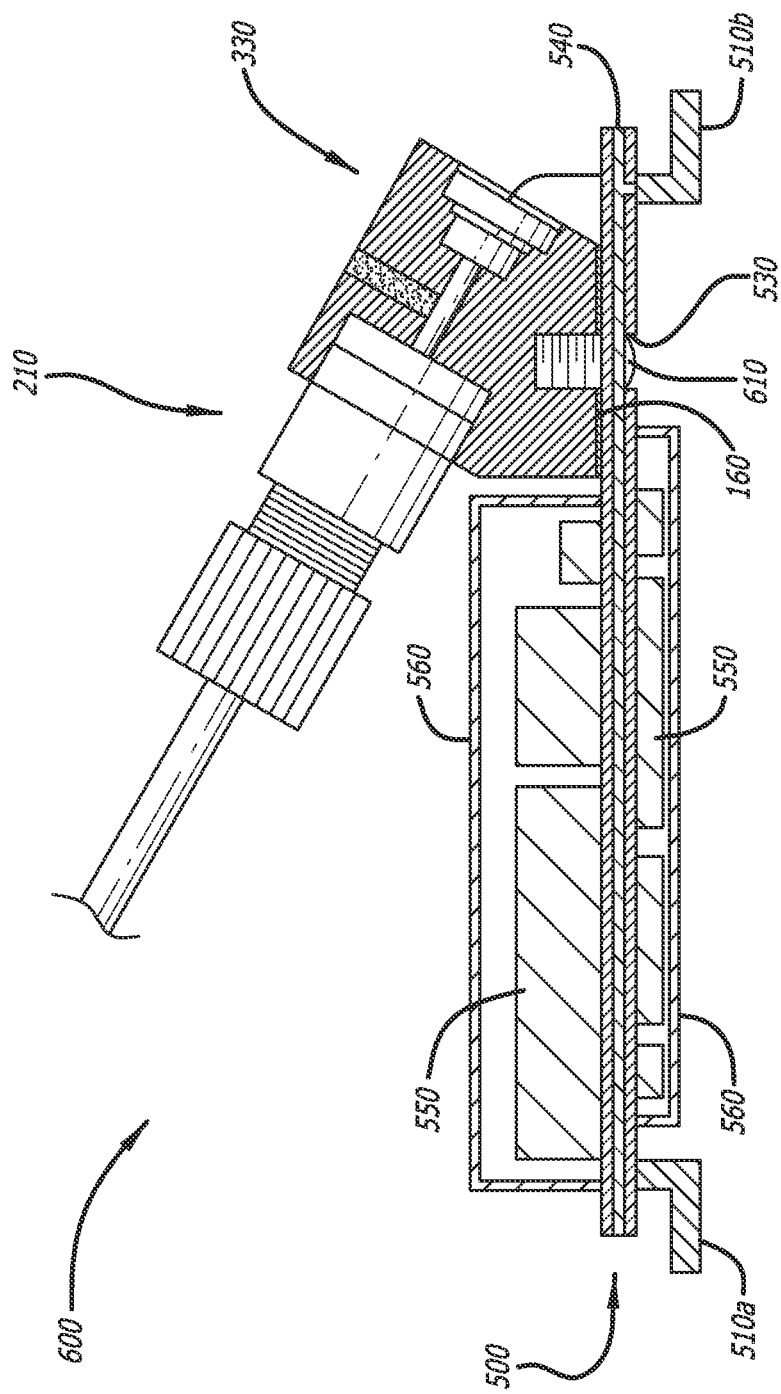

FIG. 6 is a diagram showing the assembly process of mounting a Tx OSA to a Tx OMC PCB, in accordance with at least one embodiment of the present disclosure.

Figure 7A:
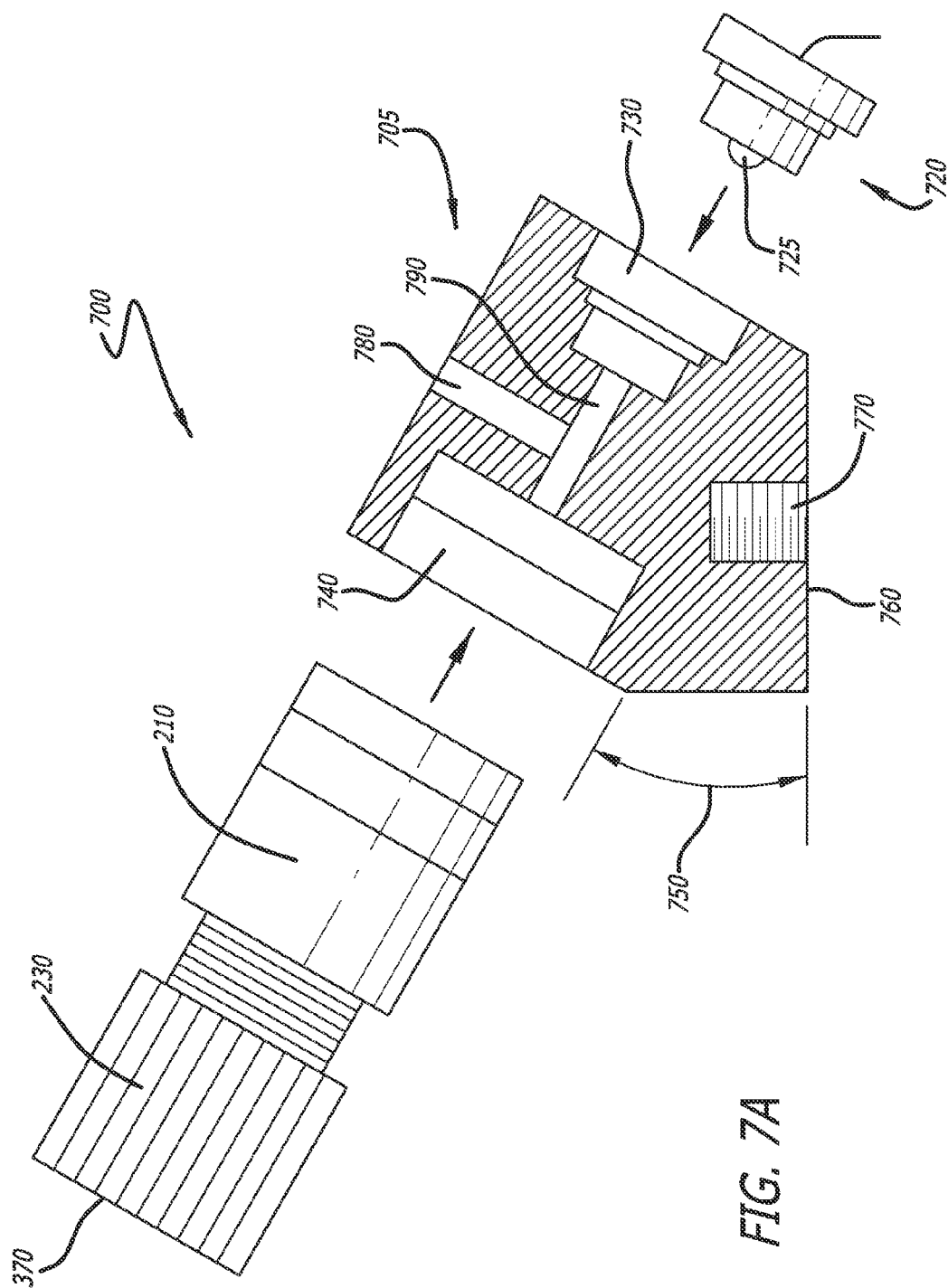
Figure 7B:
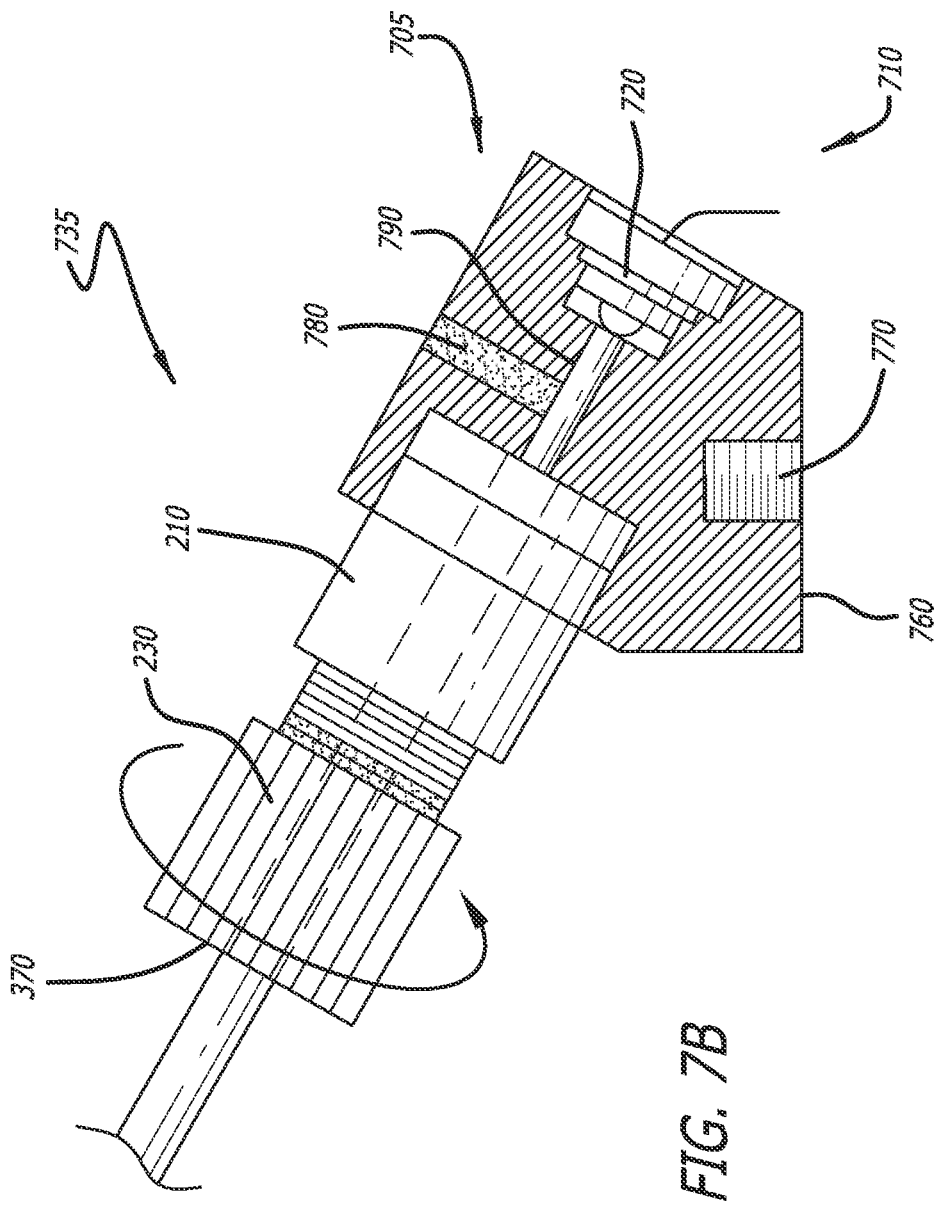

FIGS. 7A and 7B are diagrams illustrating the assembly process of a receiver (Rx) OSA, in accordance with at least one embodiment of the present disclosure.

FIGS. 8A, 8B, and 8C are diagrams illustrating the Rx OMC PCB design and assembly process, in accordance with at least one embodiment of the present disclosure.

Figure 9:
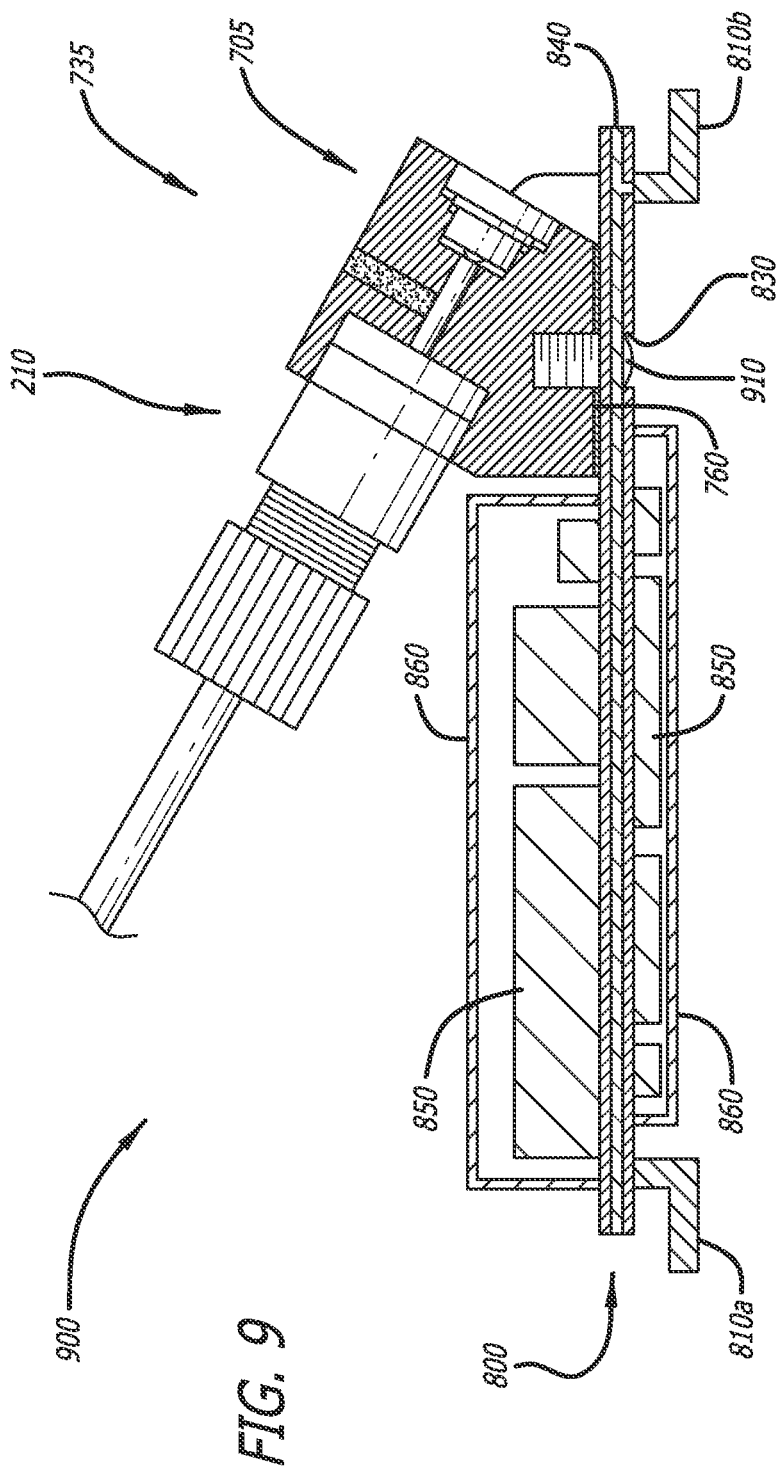

FIG. 9 is a diagram showing the assembly process of mounting a Rx OSA to a Rx OMC PCB, in accordance with at least one embodiment of the present disclosure.

Figure 10:
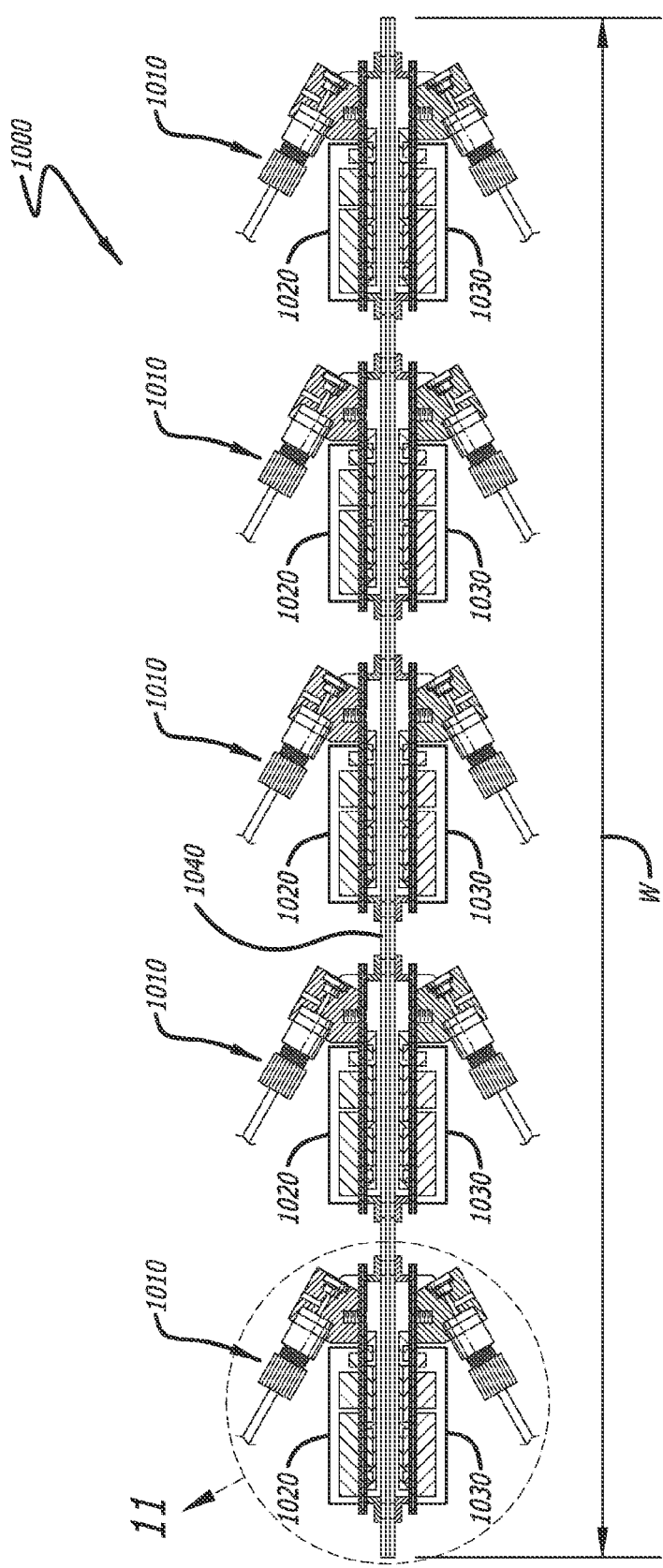

FIG. 10 is a diagram showing the assembly of optical media converters (OMCs) (comprising Tx OMC portions and Rx OMC portions) mounted onto a copper core PCB mother board, in accordance with at least one embodiment of the present disclosure.

Figure 11:
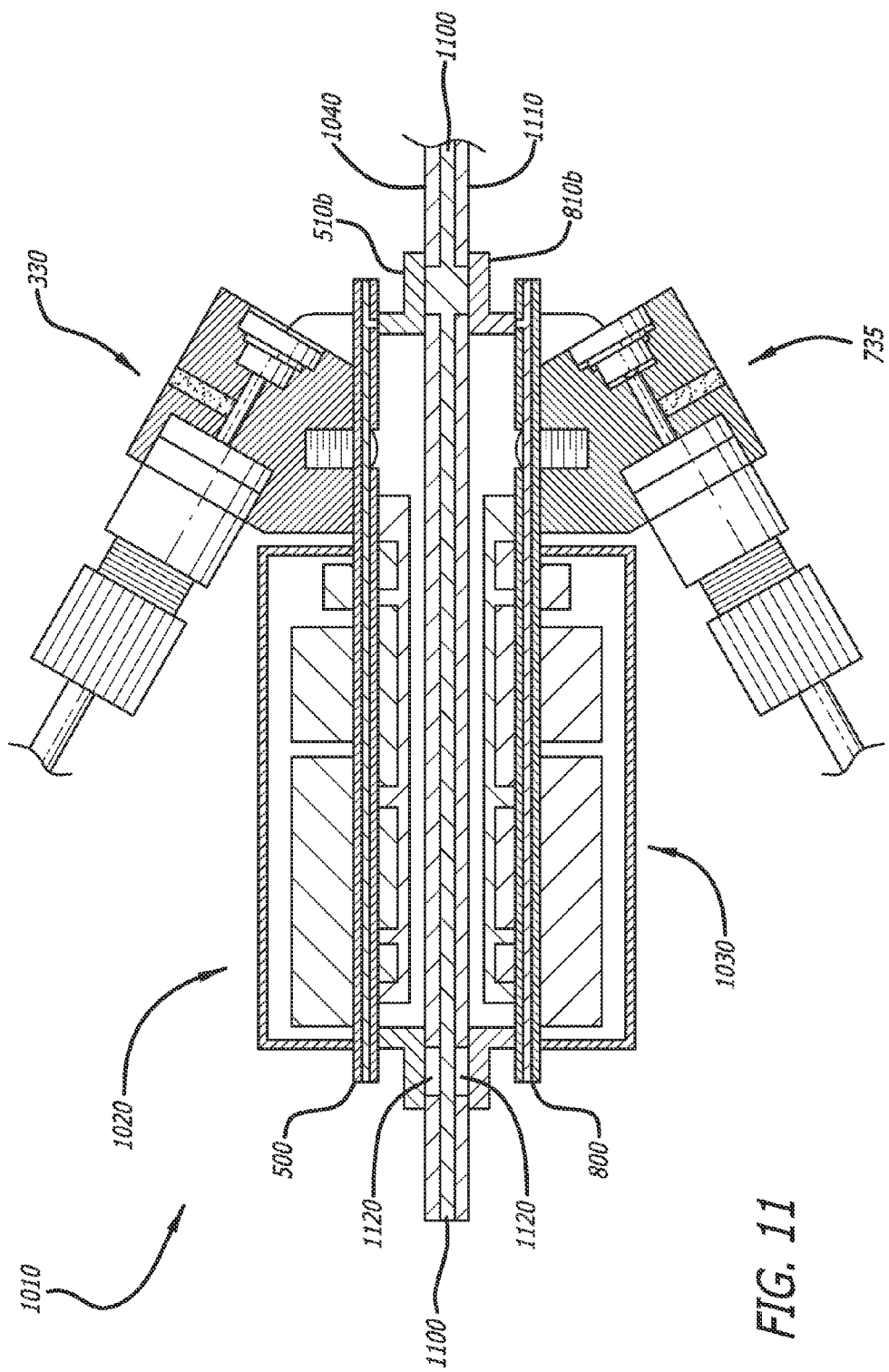

FIG. 11 is a diagram showing the details of a OMC (comprising a Tx OMC portion and an Rx OMC portion) mounted onto a copper core PCB mother board, in accordance with at least one embodiment of the present disclosure.

Figure 12:
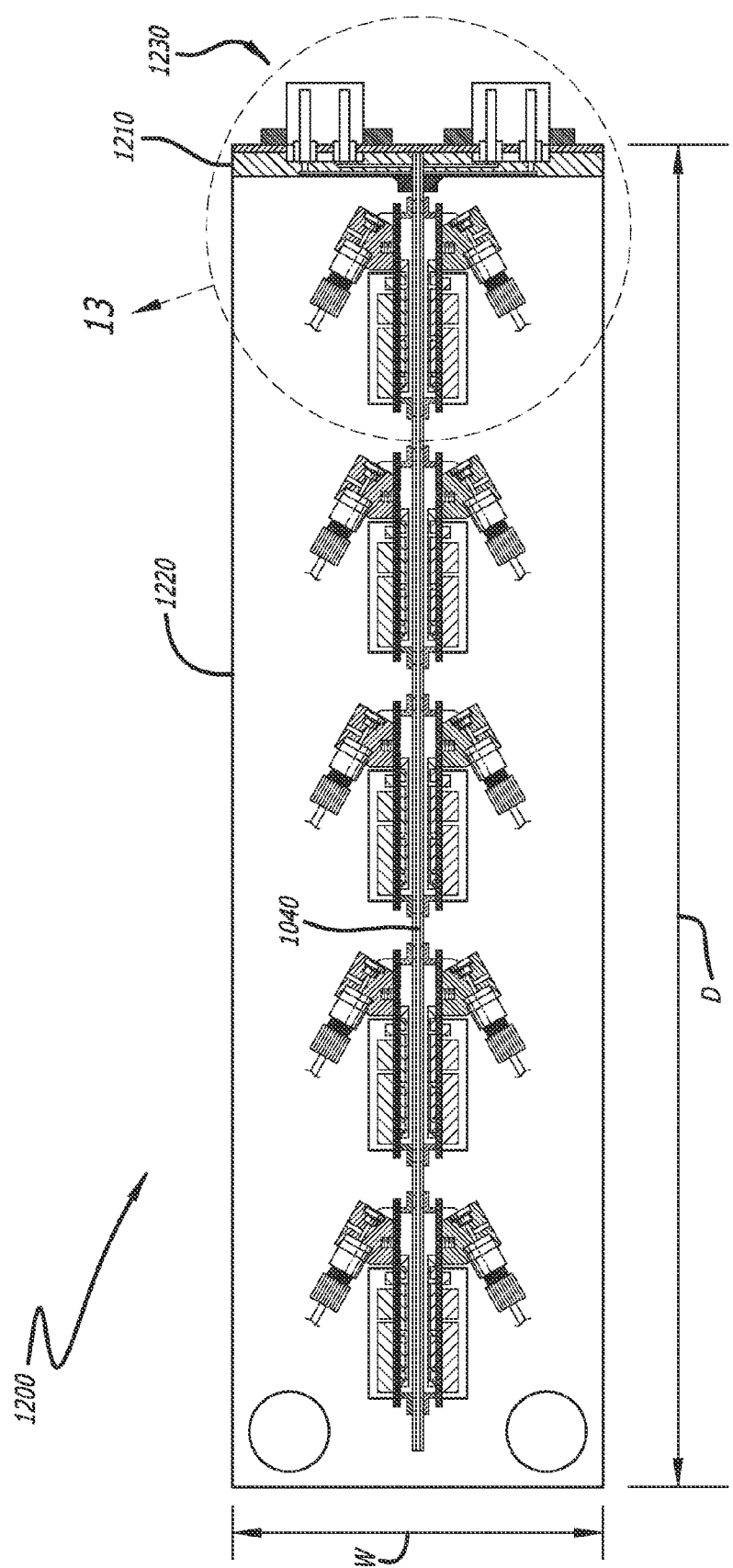

FIG. 12 is a diagram showing the assembled PCB mother board inserted into the back plane of a 3 MCU sized data bus-in-a-box (BiB), in accordance with at least one embodiment of the present disclosure.

Figure 13:
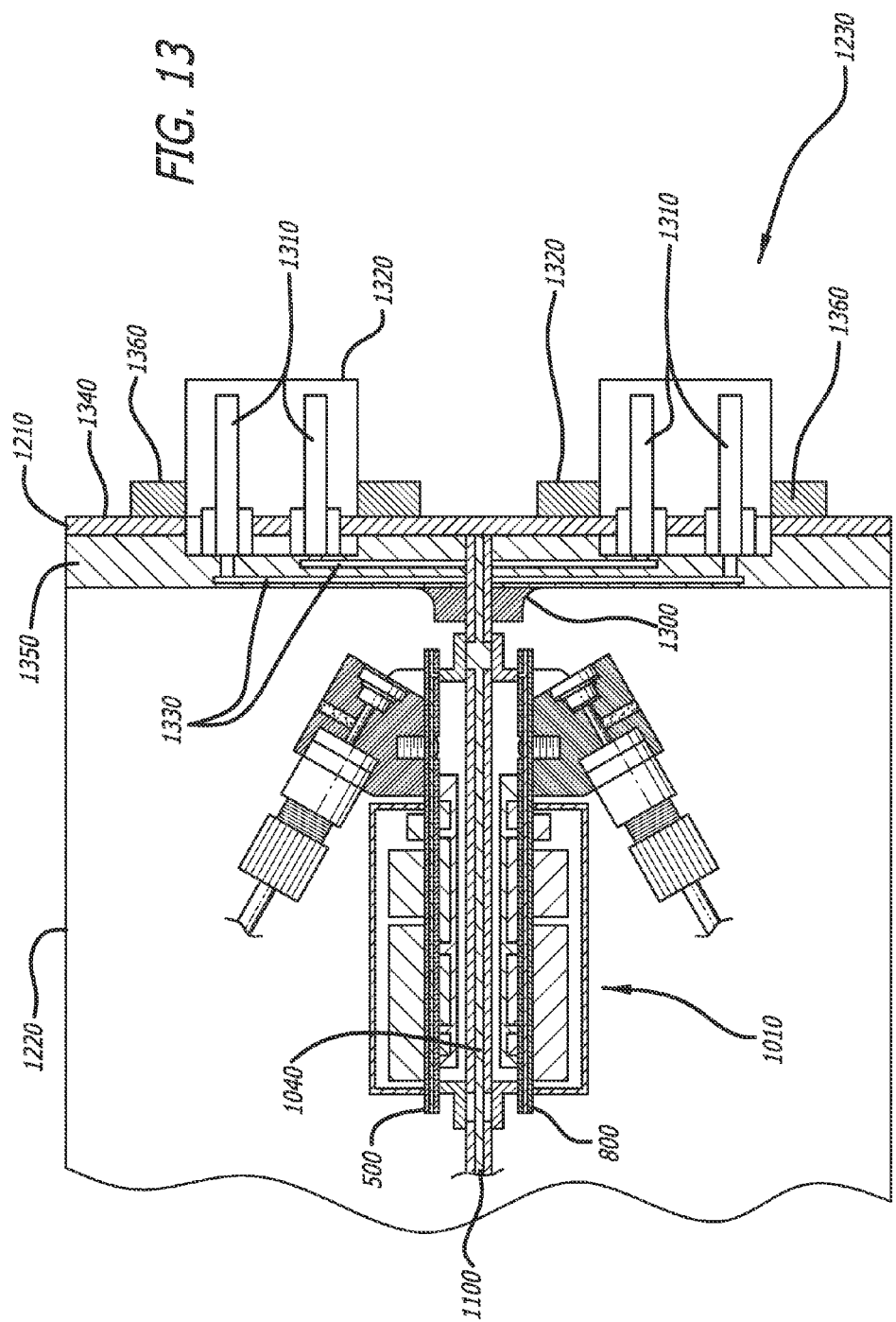

FIG. 13 is a diagram showing the details of the assembled PCB mother board inserted into the back plane of a 3 MCU sized data bus-in-a-box (BiB), in accordance with at least one embodiment of the present disclosure.

Figure 14:
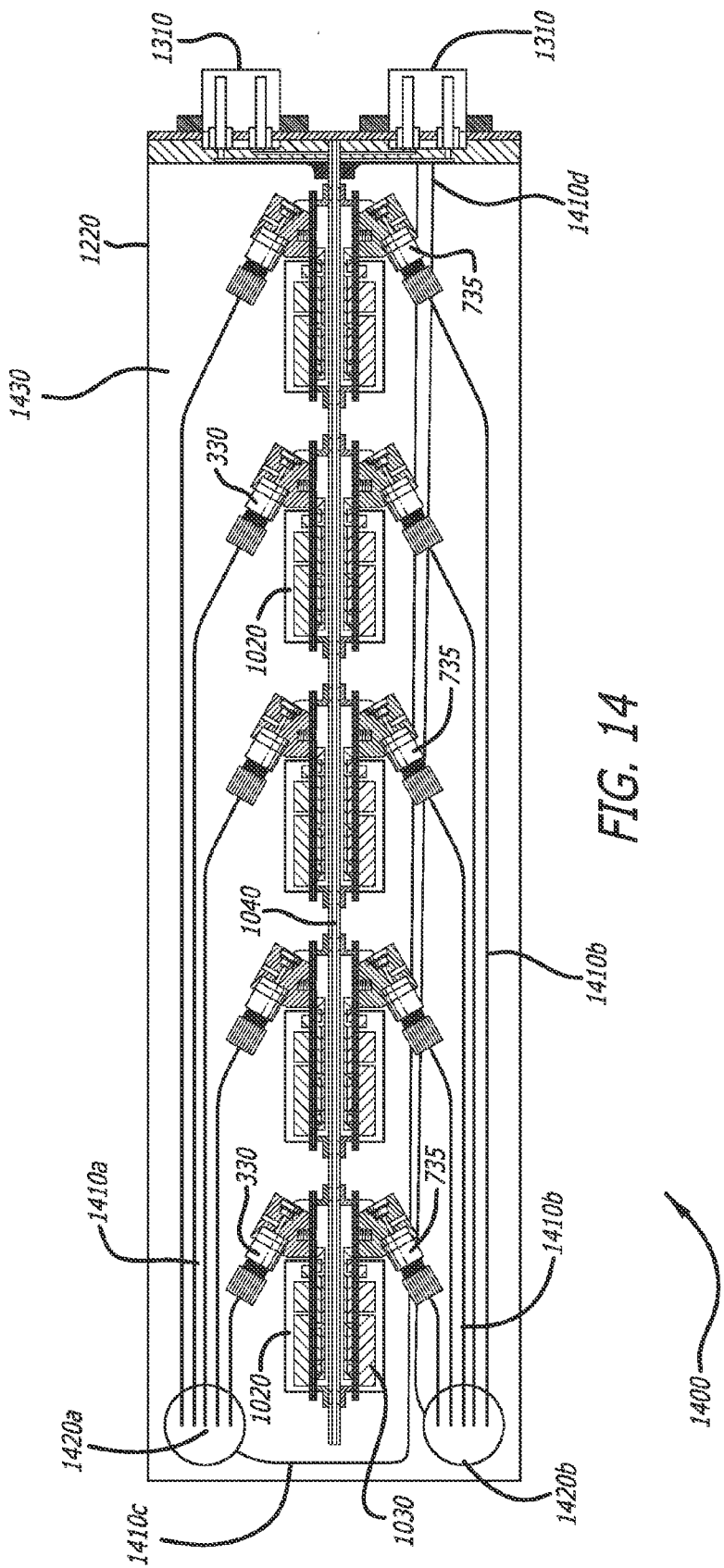

FIG. 14 is a diagram showing the connections of plastic optical fiber (POF) from POF star couplers to the Tx OMC portions and the Rx OMC portions and to optical connectors on the side of the data BiB, in accordance with at least one embodiment of the present disclosure.

Figure 15:
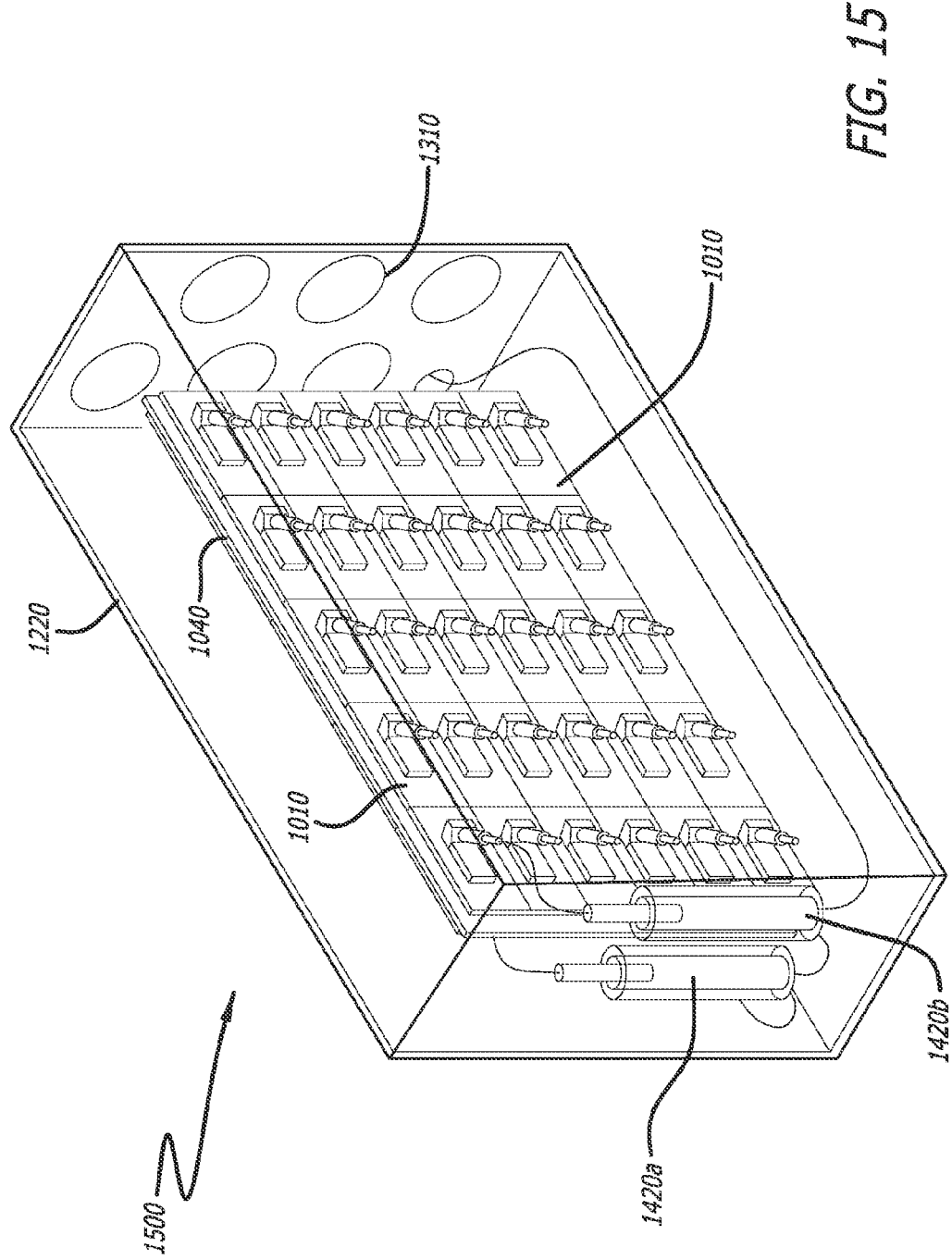

FIG. 15 is a diagram illustrating an interior view of the data BiB after final assembly, in accordance with at least one embodiment of the present disclosure.

DESCRIPTION

The methods and apparatus disclosed herein provide an operative system for a low cost, connectorless, ruggedized small form factor optical sub-assembly (OSA) and data bus-in-a-box (BiB) design and assembly process. The present disclosure involves the design and fabrication process of a tilted optical sub-assembly (OSA). The disclosed OSA provides maximum space allocation for the electronic circuits on the printed circuit board (PCB) (e.g., mother board) of the disclosed data BiB design; while at the same time, maintains the optimum optical performance for both the transmitter and receiver to provide a minimum of a 54 decibels (dB) power budget required for the POF 629 system data bus of a modern aircraft.

The disclosed OSA design uses a POF lock nut and a high precision, high thermal conductivity and electrically insulating, molded, cool polymer package body to embed the laser transmitter and receiver in a hermetically sealed transistor outline (TO) can package. The cool polymer package body is precision molded to align a POF to the laser transmitter and receiver passively, without labor intensive POF active alignment steps. Securing the lock nut together with using a mil-spec grade epoxy provides an environmental seal to the POF end face to the surface of the TO can. The use of a POF lock nut eliminates the need for connectors to couple the POF, thereby further reducing the assembly cost for the data BiB POF 629 system. The disclosed OSA design meets the low cost, high performance, and stringent environmental requirements of the POF 629 system data bus for aircraft production.

A POF 629 data system bus architecture for an exemplary modern aircraft requires thirty (30) optical media converters (OMCs). The disclosed data BiB design utilizes a 3 MCU sized box (i.e. 3.56 inches (") width (W)×7.46" height (H)× 12.76" depth (D)). As such, the 30 optical transmitters and receivers need to be incorporated into a small sized box (e.g., 3 MCU sized box). Since electronic circuits occupy most of the space on the PCB (e.g., mother board) of the BiB design, a conventional flat surface, fiber optic transceiver package form factor is too large to be incorporated onto the disclosed BiB PCB. To solve this problem, each OMC employs a titled Rx OSA and a tilted Tx OSA. The disclosed tilted OSA design allows for packaging of the 30 OMCs into the small sized box of the disclosed data BiB.

The present disclosure presents the concept of replacing the copper bus cables, the quad stub cables, the couplers, and the complex coupler panel assembly of the ARINC 629 system bus that is currently employed in modern airplanes with the disclosed POF 629 optical data BiB. The basic approach of the POF 629 data BiB is to replace the current mode coupler data bus with plastic optical fiber (POF), optical media converters (OMCs), and POF couplers (e.g., star couplers). The projected weight savings by using the disclosed data BiB, instead of using a conventional copper ARINC 629 data bus, is over 100 pounds (lbs) per airplane, and the projected cost savings is over $100K per airplane.

An exemplary modern aircraft system bus architecture connects up to 30 line replaceable units (LRUs) in the front (or forward) section of the aircraft and connects 2 to 4 LRUs in the back (or aft) section of the airplane. To achieve a desired size, weight, power, and cost reduction for the disclosed system data BiB design, the challenge was to package and assemble 30 (e.g., 25 plus 5 spare) OMCs in a compact 3 MCU (or 4 MCU) sized avionics box, while at the same time achieve high reliability and ruggedness that are required by the commercial avionics environment. The description of the figures below discusses the disclosed optical sub-assembly (OSA) design and the assembly process for the disclosed data BiB. The OSA design and assembly process are the key to achieving the desired size, weight, power, and cost reduction objectives for the POF 629 system data bus in the modern airplane.

Each OMC in the data BiB is made up of a transmitter (Tx) PCB and a receiver (Rx) PCB. Each Tx and Rx PCB are approximately 2" by 1" in dimensions, and are manufactured from two-sided copper core PCB to allow for maximum space allocation for the electronics components, such as inductors, capacitors, resistors, and integrated circuit (IC) chips, which take up a large portion of the PCB space. As such, the design of the OSA needs to be compact and to be able to occupy a minimum space on the PCB. Regarding the disclosed Tx OSA design, the Tx OSA houses a laser in a hermetically sealed transistor outline (TO) can, which needs to be precisely coupled to the POF to achieve maximum transmit output power. For the disclosed Rx OSA design, the Rx OSA houses a receiver in a hermetically sealed TO can with a lens cap, and the receiver TO can needs to be precisely coupled to the POF to achieve maximum receiver sensitivity. The disclosed Tx OSA and Rx OSA designs for the system bus of the POF 629 architecture are able to assure (as required for the system data bus of some modern aircraft) a minimum of a 54 decibel (dB) power budget over the operating temperature range of −40° Celsius (C) to 85° C., and at the same time maintain this performance over twenty (20) years of operating life time under stringent avionics environments, such as high vibration, humidity, and contamination.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with, and that the system described herein is merely one example embodiment of the present disclosure.

For the sake of brevity, conventional techniques and components related to optical sub-assemblies (OSAs) and data buses, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIGS. 1A and 1B are diagrams showing the disclosed optical sub-assembly (OSA) package body 100, in accordance with at least one embodiment of the present disclosure. In particular, FIG. 1A shows the side view 110 of a tilted Tx OSA package body 100, and FIG. 1B shows the bottom 120 view of the tilted Tx OSA package body 100. The shape and dimensions of the OSA package body 100 are designed to accommodate a POF alignment lock nut and a Tx laser diode TO can. As such, the OSA package body 100 has a POF lock nut recess hole (e.g., a first cavity of the package body) 140 and a TO can recess hole (e.g., a second cavity of the package body) 130.

The OSA package body 100 is designed to have a 30 degrees tilt angle 150 from the plane of the base 160 of the OSA package body 100 (e.g., from the plane of the mounting surface (or bottom surface) 160 of the OSA package body 100). The OSA package body 100 is tilted to allow for more space for electronic components on the Tx OMC PCB, without affecting the optimum optical alignment position of the POF to the laser diode inside the TO can.

The bottom side of the tilted Tx OSA package body 100 has two small (or one large) threaded holes 170 for securely mounting the Tx OSA package body 100 onto the Tx OMC PCB. The OSA package body 100 is made from a cool poly material, which is a high thermal conductivity, non-conducting polymer material. The OSA package body 100 is fabricated by a high volume, low cost, precision molding process. The TO can and the POF lock nut are inserted into the cavities 130, 140, respectively, of the OSA package body 100, and attached to the OSA package body 100 by mil spec grade epoxy. The body has a POF glue hole (e.g., a third cavity of the package body) 180 in the middle to fill in mil spec grade epoxy for holding the POF in the groove hole 190 of OSA package body 100, and for also providing an environmental seal of the bare portion of the POF inside the alignment groove 190.

Figure 2:
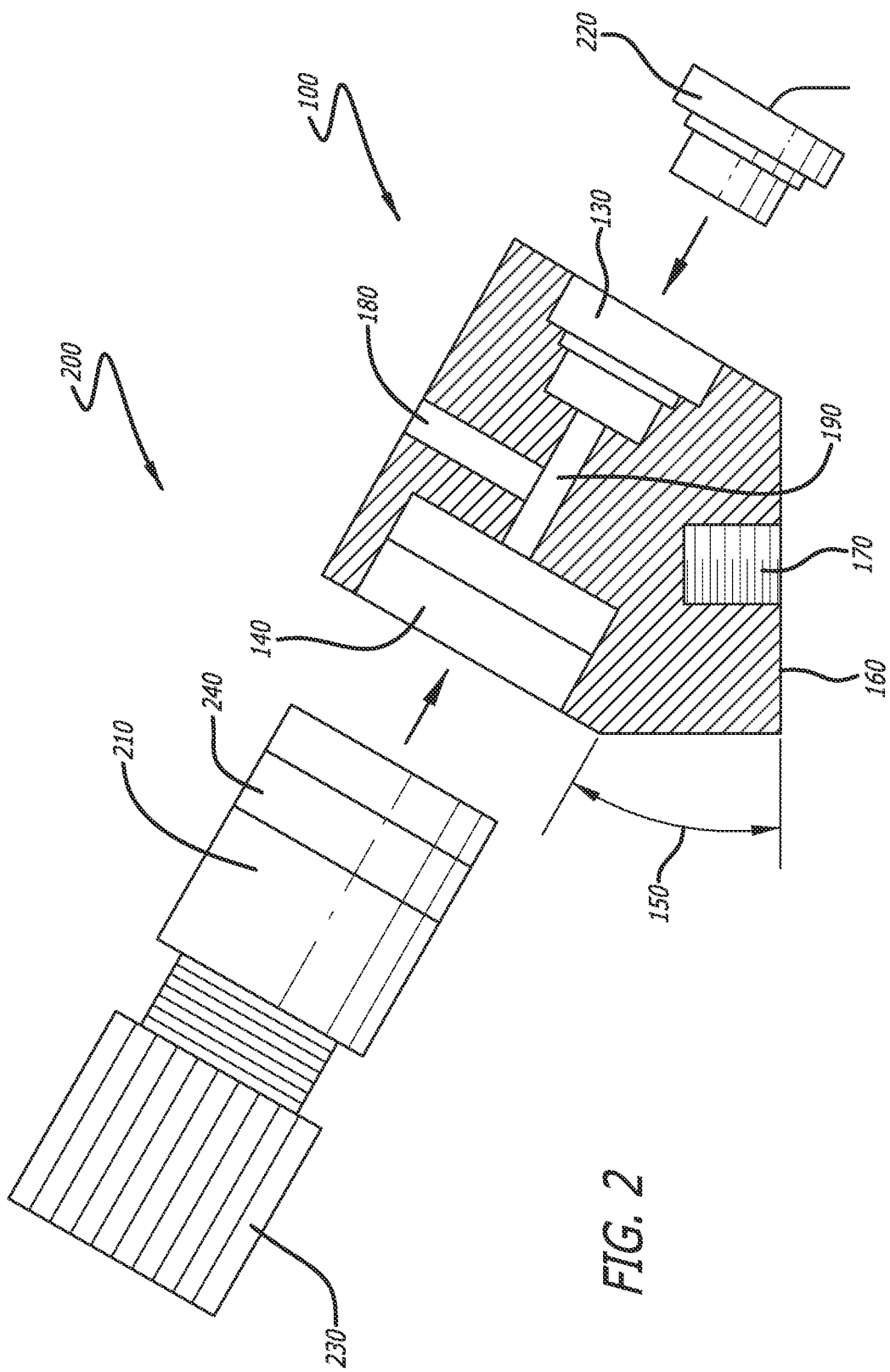
FIG. 2 is a diagram illustrating the assembly process of the disclosed OSA, in accordance with at least one embodiment of the present disclosure.

FIG. 2 is a diagram 200 illustrating the assembly process of the disclosed OSA, in accordance with at least one embodiment of the present disclosure. In particular, FIG. 2 shows a POF lock nut 210 and a laser Tx TO can 220 to be inserted into the first cavity 140 and the second cavity 130, respectively, of the OSA package body 100 of FIG. 1. The lock nut 210 has a turning knob 230 for locking the POF inserted into the OSA package body 100. The lock nut 210 has two rectangular anti-rotation flanges 240 located on two sides of the lock nut 210.

Figure 3A:
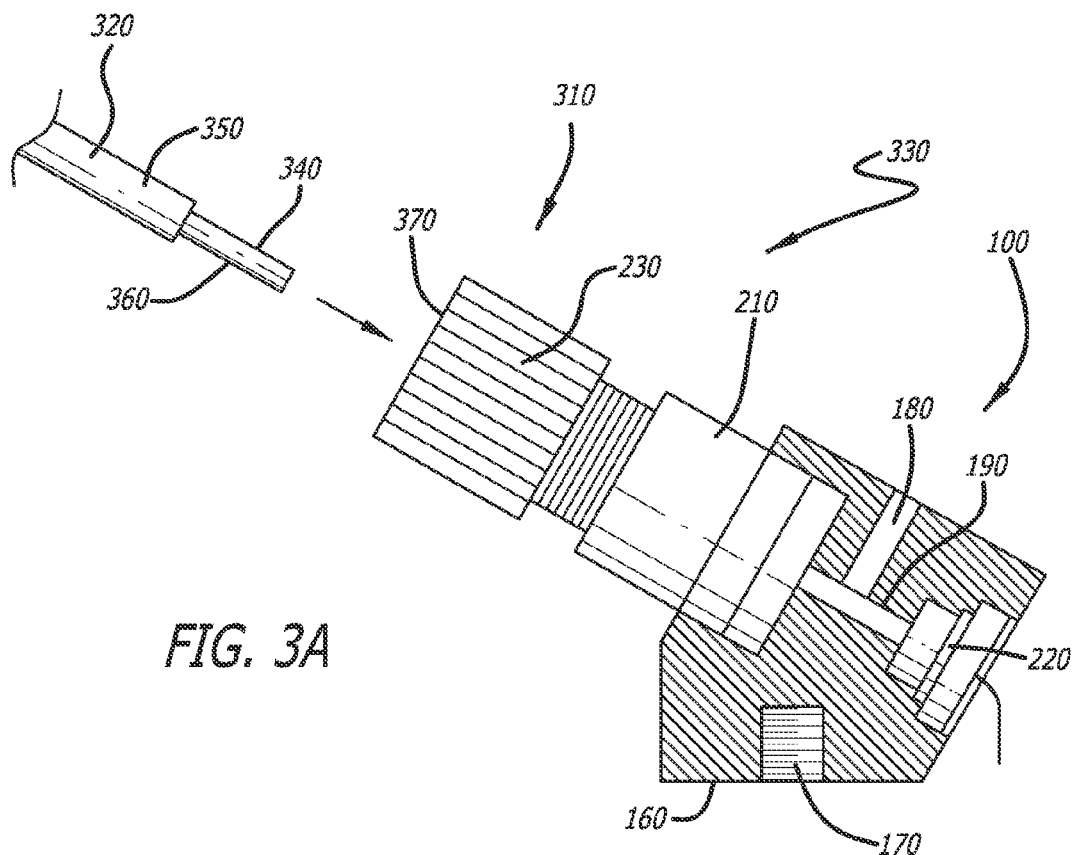
FIGS. 3A and 3B are additional diagrams illustrating the assembly process of the disclosed OSA, in accordance with at least one embodiment of the present disclosure.
Figure 3B:
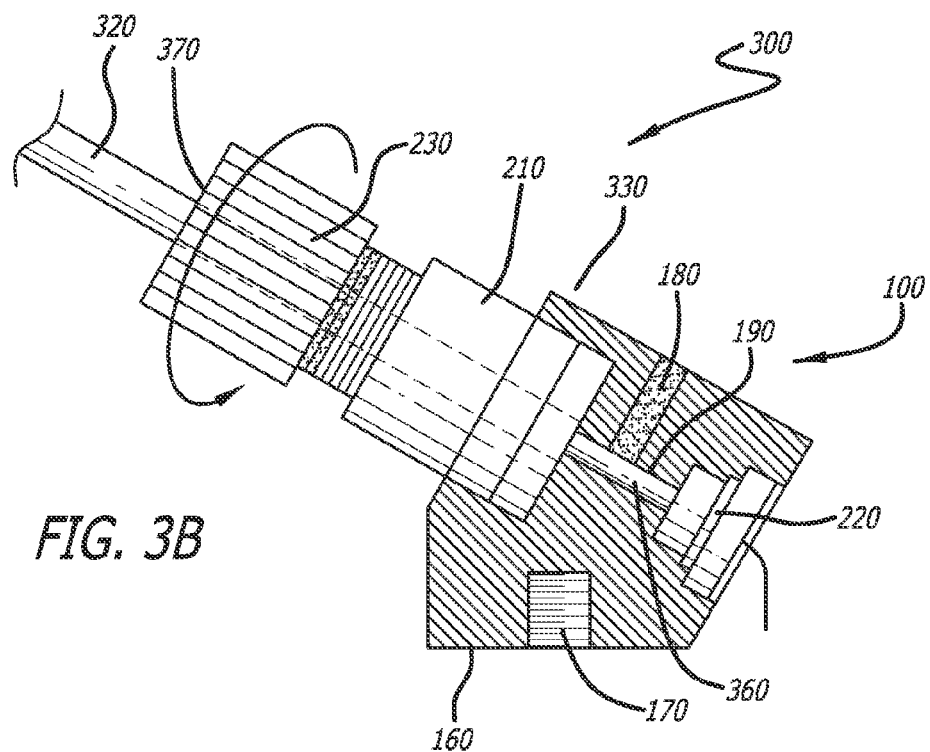

FIGS. 3A and 3B are additional diagrams 300, 310 illustrating the assembly process of the disclosed OSA, in accordance with at least one embodiment of the present disclosure. In particular, FIG. 3A shows an assembled OSA 330 with a POF 320 ready to be inserted, and FIG. 3B shows the POF 320 inserted into the assembled OSA 330 through the lock nut 210 and fitted into the POF groove 190, where the POF 320 is aligned precisely to the laser in the Tx TO can 220. The POF 320 has a core diameter 340 of about 1 millimeter (mm) and the jacketed diameter 350 of about 2.2 mm. The diameter of the POF groove 190 is designed to closely match the diameter of the POF core 340. The jacket of the POF 320 is stripped off a small section at the tip 360 to allow the core insertion in the POF groove 190. After insertion of the POF 320 into the OSA package body 100, the knob 230 of the lock nut 210 is turned to secure the POF 320 to the OSA package body 100. Additionally, mil spec grade epoxy is filled in the OSA body glue hole (e.g., the third cavity of the package body) 180 to permanently attach the POF 320 to the tilted OSA package body 100. The epoxy also provides an environmental seal for a portion of the POF 340 and the TO can 220 interface. Epoxy can optionally be added to the end 370 of the lock nut 210 to prevent loosening of the knob 230 during operation of the data BiB. The assembled OSA 330 requires no POF connector to mate with the Tx laser TO can 220. This eliminates the cost associated with POF connectors, and also eliminates the requirement for the space needed for the POF connectors inside of the data BiB.

FIG. 4 is a flow chart of the disclosed method 400 for manufacturing an OSA, in accordance with at least one embodiment of the present disclosure. At the start 410 of the method 400, a first end of a lock nut is inserted into (and glued to) a first cavity of a package body 420. A first end of a transistor outline (TO) can is inserted into (and glued to) a second cavity of the package body 430. A portion of a jacket from an end of an optical fiber (e.g., plastic optical fiber) is stripped, thereby exposing a bare portion of the optical fiber at the end of the optical fiber 440. The end of the optical fiber (i.e. the end with the exposed bare optical fiber) is inserted into a second end of the lock nut such that the bare optical fiber passes through the package body and at least a portion of the bare optical fiber (e.g., an end face of the bare optical fiber) inserts into a cavity of the TO can 450. Glue is inserted (or dispensed) into a third cavity of the package body to environmentally seal the bare optical fiber 460. Then, the method ends.

FIGS. 5A, 5B, and 5C are diagrams illustrating the transmit (Tx) optical media converter (OMC) printed circuit board (PCB) design and assembly process, in accordance with at least one embodiment of the present disclosure. Specifically, FIG. 5A shows a Tx PCB (e.g., a 2"×1" double sided PCB with a copper core 540) 500 with two set of metal pins 510a, 510b on its sides. These pins 510a, 520b may be pins of various shapes (e.g., L-bend shaped, J-bend shaped, and/or straight pins) that are compatible with the low cost and highly reliable PCB surface mounting (SMT) processes. The PCB 500 has thermal via holes 520 that connect the set of the metal pins 510b to the copper core 540 of the PCB 500 for thermal conduction and heat sinking to the mother board of the data BiB. Another set of electrically insulated metal pins 510a connects the signal and power lines of the Tx OMC PCB 500 to the BiB mother board. The PCB 500 also has a screw hole 530 for mounting a Tx OSA onto the Tx PCB 500.

FIG. 5B shows electronic components 550 assembled (e.g., mounted) on both sides of the Tx OMC PCB 500 by using, for example, SMT technology. FIG. 5C shows electromagnetic interference (EMI) protection metal lids 560 assembled (e.g., mounted) on both the top and bottom sides of the Tx PCB 500.

FIG. 6 is a diagram 600 showing the assembly process of mounting a Tx OSA 330 (refer to FIGS. 3A and 3B) to a Tx OMC PCB 500 (refer to FIGS. 5A, 5B, and 5C), in accordance with at least one embodiment of the present disclosure. In particular, FIG. 6 shows a tilted Tx OSA 330 attached onto a Tx PCB 500, which, for example, is assembled as shown in FIG. 5. Before the Tx OSA 330 is mechanically attached to the Tx PCB 500, mil spec grade, thermally conductive, epoxy is applied to the bottom side 160 of the Tx OSA 330. Then, the Tx OSA 330 is attached to the Tx PCB 500 via a mounting screw 610 placed into the pre-made mounting hole 530 on the Tx PCB 500. After the epoxy has cured, the Tx OSA 330 is permanently attached to the surface the Tx PCB 500. Because of the tilting of the POF in the Tx OSA 330, the POF fiber and the lock nut 210 are not taking any space on the Tx PCB 500, thereby leaving a lot of extra area for mounting electronic components onto the Tx PCB 500.

FIGS. 7A and 7B are diagrams 700, 710 illustrating the assembly process of a receiver (Rx) OSA, in accordance with at least one embodiment of the present disclosure. Specifically, FIGS. 7A and 7B show a tilted Rx OSA 735 design, which is similar to the Tx OSA 330 design described in FIGS. 3A and 3B. In particular, FIG. 7B shows an assembled Rx OSA 735 ready for POF insertion, and FIG. 7A shows a lock nut 210 ready to be inserted into a POF lock nut recess hole (e.g., a first cavity of the package body) 740 in the Rx OSA package body 705.

The Rx OSA package body 705 houses the Rx TO can 720, which has a lens cap 725. The size of the recess region (e.g., a second cavity of the package body) 730 of Rx OSA package body 705 has to precisely fit the Rx TO can 720 and to center the lens of the TO can 720 at an optimum distance from the center of the end face of the POF. This distance is crucial to achieve over −34 decibel-milliwatts (dBm) or higher receiver sensitivity for the Rx OMC.

The OSA package body 705 is designed to have a 30 degrees tilt angle 750 from the plane of the base 760 of the OSA package body 705 (e.g., from the plane of the mounting surface (or bottom surface) 760 of the OSA package body 705). The OSA package body 705 is tilted to allow for more space for electronic components on the Rx OMC PCB, without affecting the optimum optical alignment position of the POF to the detector inside the TO can.

The bottom side of the tilted Rx OSA package body 705 has two small (or one large) threaded holes 770 for securely mounting the Rx OSA package body 705 onto the Rx OMC PCB. The OSA package body 705 is made from a cool poly material, which is a high thermal conductivity, non-conducting polymer material. The OSA package body 705 is fabricated by a high volume, low cost, precision molding process.

A POF (not shown) is to be inserted into the assembled Rx OSA 735 through the lock nut 210 and fitted into the POF groove 790, where the POF is aligned precisely to the detector in the Rx TO can 220. The POF has a core diameter of about 1 millimeter (mm) and the jacketed diameter of about 2.2 mm. The diameter of the POF groove 190 is designed to closely match the diameter of the POF core. The jacket of the POF is stripped off a small section at the tip to allow the core insertion in the POF groove 190. After insertion of the POF into the OSA package body 705, the knob 230 of the lock nut 210 is turned to secure the POF to the OSA package body 705. Additionally, mil spec grade epoxy is filled in the OSA body glue hole (e.g., the third cavity of the package body) 780 to permanently attach the POF to the tilted OSA package body 705. The epoxy also provides an environmental seal for the POF and TO can 720 interface. Epoxy can optionally be added to the end 370 of the lock nut 210 to prevent loosening of the knob 230 during operation of the data BiB. The assembled OSA 735 requires no POF connector to mate with the Rx detector TO can 720. This eliminates the cost associated with POF connectors, and also eliminates the requirement for the space needed for the POF connectors inside of the data BiB.

FIGS. 8A, 8B, and 8C are diagrams illustrating the Rx OMC PCB design and assembly process, in accordance with at least one embodiment of the present disclosure. In particular, FIGS. 8A, 8B, and 8C show the Rx OMC PCB design and assembly process, which are similar to the Tx OMC PCB assembly process shown in FIGS. 5A, 5B, and 5C; except for FIGS. 8A, 8B, and 8C, the electronic components are selected for use with the Rx OMC.

Specifically, FIG. 8A shows a Rx PCB (e.g., a 2"×1" double sided PCB with copper core 840) 800 with two set of metal pins 810a, 810b on its sides. Pins 810a, 820b may be pins of various shapes (e.g., L-bend shaped, J-bend shaped, and/or straight pins) that are compatible with the low cost and highly reliable PCB surface mounting (SMT) processes. The PCB 800 has thermal via holes 820 that connect the set of the metal pins 810b to the copper core 840 of the PCB 800 for thermal conduction and heat sinking to the mother board of the data BiB. Another set of electrically insulated metal pins 810a connects the signal and power lines of the Rx OMC PCB 800 to the BiB mother board. The PCB 800 also includes a screw hole 830 for mounting a Rx OSA onto the Rx PCB 800.

FIG. 8B shows electronic components 850 assembled on both sides of the Rx OMC PCB 800 by using, for example, SMT technology. FIG. 8C shows electromagnetic interference (EMI) protection metal lids 860 assembled on both the top and bottom sides of the Rx PCB 800.

FIG. 9 is a diagram showing the assembly process of mounting an Rx OSA 735 to a Rx OMC PCB 800, in accordance with at least one embodiment of the present disclosure. Specifically, FIG. 9 shows an Rx OMC PCB assembly 735 with a tilted Rx OSA package body 705 attached to a Rx OMC PCB 800 by using the same process steps for the Tx OSA 330 as described in FIG. 6. The tilted Rx OSA's fiber lock nut 210 does not occupy any space on the Rx PCB 800 and, as such, this provides the maximum space allocation for the electronic components on the Rx PCB 800.

In particular, FIG. 9 shows a tilted Rx OSA 735 attached onto an Rx PCB 800, which, for example, is assembled as shown in FIGS. 7A and 7B. Before the Rx OSA 735 is mechanically attached to the Rx PCB 800, mil spec grade epoxy is applied to the bottom side 760 of the Rx OSA 735. Then, the Rx OSA 735 is attached to the Rx PCB 800 via a mounting screw 910 placed into the pre-made mounting hole 830 on the Rx PCB 800. After the epoxy has cured, the Rx OSA 735 is permanently attached to the surface the Rx PCB 800.

FIG. 10 is a diagram 1000 showing the assembly of optical media converters (OMCs) 1010 (comprising Tx OMC portions 1020 and Rx OMC portions 1030) mounted onto a copper core PCB mother board 1040, in accordance with at least one embodiment of the present disclosure. In particular, FIG. 10 shows the top view of one (1) row of Tx OMC portions 1020 of an OMC 1010 and 1 row of Rx OMC portions 1030 of an OMC 1010 attached to a 12.5" width (W) by 7" height (H) PCB mother board 1040 of the data BiB. The details of a single OMC 1010 will be described in detail in the description of FIG. 11.

FIG. 11 is a diagram showing the details of a OMC (comprising a Tx OMC portion 1020 and an Rx OMC portion 1030) 1010 mounted onto a copper core 1100 PCB mother board 1040, in accordance with at least one embodiment of the present disclosure. As shown in FIG. 11, the data BiB mother board 1040 is a two-sided PCB with a thick copper core 1100 for maximum thermal heat sinking of the Tx OMC PCB 500 and the Rx OMC PCB 800 to the data BiB back plane (refer to 1210 of FIG. 12). The mother board 1040 has thermal via holes 1110 to connect the Tx OMC thermal pins 510b and the Rx OMC thermal pins 810b to the copper core 1100 of the mother board 1040.

The mother board 1040 also has signal via hole 1120 for connecting the signal (e.g. by using a signal wire) from the Tx OMC PCB 500 to the Rx OMC PCB 800, and vice versa. An under filling process is used to add thermal conductive and electrical insulating epoxy between the bottom of the Tx OMC PCB 500 and the mother board 1040 for mechanical strength enhancement and heat sinking of Tx OMC PCB 500 to the mother board 1040. In addition, an under filling process is used to add thermal conductive and electrical insulating epoxy between the bottom of the Rx OMC PCB 800 and the mother board 1040 for mechanical strength enhancement and heat sinking of Rx OMC PCB 800 to the mother board 1040.

Referring back to FIG. 10, the mother board 1040 is designed such that one side will have all Rx OMC portions 1030 and the opposite side will have all Tx OMC portions 1020. This way, the connections of the POF to the Rx OMC portions 1030 and the connections of the POF to the Tx OMC portions 1020 will not need to cross over the mother board 1040 in the middle of the data BIB. This feature will be more clearly shown in FIG. 14. The mother board 1040 for the disclosed data BiB accommodates 30 (i.e. 5 columns×6 rows) Tx OMC portions 1020 on one side and 30 (i.e. 5 columns×6 rows) Rx OMC portions 1030 on the opposite side. This allows for a total of 30 OMCs 1010 with full Tx and Rx operation on a single mother board 1040. An alternative arrangement of 3 columns×10 rows OMC portions on each side of the mother board 1040 is also acceptable for the disclosed data BiB design.

FIG. 12 is a diagram 1200 showing the assembled PCB mother board 1040 inserted into the back plane 1210 of a 3 MCU sized data bus-in-a-box (BiB) 1220, in accordance with at least one embodiment of the present disclosure. In particular, FIG. 12 shows the completely populated mother board 1040 inserted into the backplane 1210 of a 3 MCU sized data BiB 1220 with a width (W) of 3.56" and a depth (D) of 12.76" and a height (H) of 7.64". It should be noted that 4 MCU sized data BiB with a 4.88" width is an acceptable alternative size, if the airplane space allocation is permitted. Section 1230 of FIG. 12 will be described in detail in the description of FIG. 13.

FIG. 13 is a diagram 1230 showing the details of the assembled PCB mother board 1040 inserted into the back plane 1210 of a 3 MCU sized data BiB 1220, in accordance with at least one embodiment of the present disclosure. In this figure, the mother board 1040 is inserted into a back plane connector 1300 to connect to, via power and signal electrical traces 1330, the power and signal pins 1310 of the LRU connectors 1320 at the back of the data BiB 1220. A guide rail (not shown) on a top and bottom edge of the mother board 1040 is used to guide and align the mother board 1040 to the back plane connector 1300. The data BiB back plane 1210 has a back plane PCB 1350 with a thermal conduction back layer 1340, which is attached to the back wall of the data BiB 1220. This thermal conduction back layer 1340 may be a metal plate or a thick copper layer on the back of the back plane PCB 1350. The copper core 1100 of the PCB mother board 1040 is connected to the thermal conduction back layer 1340 of the back plane PCB 1350 to conduct heat away from the Tx OMC PCB 500 and the Rx OMC PCB 800 to the back side of the data BiB 1220. The back of the data BiB 1220 is externally cooled by a convection air flow system in the airplane. The air flow capacity is thermally designed to remove heat efficiently away from the Tx OMC PCB 500 and Rx OMC PCB 800.

There are six LRU electrical connectors 1320 mounted to the data BiB via electrical connector mounting flanges 1360. Each electrical connector 1320 provides minimum of twenty-four (24) electrical pins 1310 to connect with six OMCs 1010. As such, five electrical connectors 1320 are used to connect the 30 OMCs 1010 with 30 LRUs in an exemplary modern aircraft system bus. There is one optical connector (not shown) that is used to connect the front data BiB 1220 (located in the front of the aircraft) to the back data BiB, which is similar in design to the front data BiB 1220 but has fewer OMC, (located in the back of the aircraft) for the modern aircraft system data bus via two POF cables, which are each 60 meters in length.

FIG. 13 shows a top view of the data BiB back plane 1210 with the electrical connector 1320 locations. An optical connector (not shown) would be located below the electrical connectors 1320 on the data BiB 1220. The data BiB back plane PCB 1350 is multi-layer structure with embedded power and signal electrical traces 1330 to connect the metal pins 1310 of the electrical connectors 1320 to the mother board 1040, which is connected to all of the fully assembled OMCs 1010. The mother board 1040 has metal pads on its edge to connect with the back plane's 1210 embedded metal traces 1330.

The alternative approach for connection of the data BiB 1220 mother board 1040 to the electrical connectors 1320 is by using a flexible (flex) circuit. This would be an acceptable approach if the thermal conductivity as well as the material and fabrication cost are compatible with using a back plane connector 1210.

FIG. 14 is a diagram 1400 showing the connections of POF cables 1410a, 1410b, 1410c, 1410d from POF star couplers 1420a, 1420b to the Tx OMC portions 1020 and the Rx OMC portions 1030 and to optical connectors 1430 on the side of the data BiB 1220, in accordance with at least one embodiment of the present disclosure. In particular, FIG. 14 shows the details of the POF 1410*a*, 1410*b*, 1410*c*, 1410*d* connections of the POF star couplers 1420*a*, 1420*b* to the tilted OSAs 330, 735. The POF star couplers 1420*a*, 1420*b* are each a tapered dual-star-in-one design. POF star coupler 1420*a* uses POF 1410*a* to connect to all of the Tx OSA portions 1020 on one side of the mother board 1040, and POF star coupler 1420*b* uses POF 1410*b* to connect to all of the Rx OSA portions 1030 on the opposite side of the mother board 1040. This data BiB 1220 OMC 1010 layout prevents the POF 1410*a*, 1410*b* from needing to cross over the mother board 1040. It should be noted that a mother board design with Tx OMC portions and Rx OMC portions co-located on the same side of the mother board would require the POF to cross-over the mother board in order to fully connect all the OMCs to the POF star couplers.

POF 1410*c*, 1410*d* are used to connect the POF star couplers 1420*a*, 1420*b* to an optical connector (not shown) located on the back side of the data BiB 1220. These POF 1410*c*, 1410*d* are used to connect the data BiB 1220 located in the back section of the modern aircraft system data bus. The data BiB located in the back section of the modern aircraft also has a POF star coupler 1410 that connects with a minimum of two OMCs 1010 at the back section of the airplane. The design and fabrication process of the data BiB 1220 located in the back of the airplane will be similar to the data BiB 1220 located in the front of the airplane, except the back data BiB 1220 will employ a smaller sized box than the front data BiB 1220. After the POF connections 1410*a*, 1410*b*, 1410*c*, 1410*d* to the POF star couplers 1420*a*, 1420*b* have been completed and tested, a light weight, thermally conductive and electrically insulating foam material 1430 is used to fill in the space between the mother board 1040 and the side walls of the data BiB 1020. The foam material 1430 adds an additional thermal conduction path for the Tx OMC PCB 500 to the data BiB 1220 side wall and for the Rx OMC PCB 800 to the data BiB 1220 side wall.

FIG. 15 is a diagram 1500 illustrating an interior view of the data BiB 1220 after final assembly, in accordance with at least one embodiment of the present disclosure. Specifically, FIG. 15 shows a schematic three dimensional (3D) conceptual view of the data BiB 1220 with 30 OMCs 1010 and a dual POF star coupler 1420*a*, 1420*b*. The POF dual star coupler 1420*a*, 1420*b* is shown in FIG. 15 to be mounted to the front side of the data BiB 1220. In alternative embodiments, the POF dual star coupler 1420*a*, 1420*b* may be mounted on the bottom side or the top side of the data BiB 1220 without a POF 1410*a*, 1410*b*, 1410*c*, 1410*d* cross over problem. Status indicator light emitting diodes (LEDs) (not shown) can be added to the back (or the front) side of the data BiB 1220 near the electrical connectors 1310 to indicate the operation status of the OMCs 1010 inside of the data BiB 1220. The OMCs 1010 (i.e. OMC PCB tiles) shown in FIG. 15 have a three (3) by (×) ten (10) tile format on each side of the mother board 1040. The approach and assembly process of the present disclosure is the same for both a 3×10 OMC PCB tile 1010 format and a five (5)×six (6) OMC PCB tile 1010 format on the mother board 1040 of the data BiB 1020. The overall disclosed data BiB 1020 design and assembly process is able to achieve optimum optical, thermal, and mechanical performance. The disclosed design provides a data BiB 1020 design with size, weight, power, and cost reduction for the a modern aircraft POF 629 system data bus architecture.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for manufacturing an optical sub-assembly (OSA), the method comprising:
    inserting a first end of a lock nut into a first cavity of a package body;
    inserting a first end of a transistor outline (TO) can into a second cavity of the package body;
    stripping a portion of a jacket from an end of an optical fiber, thereby exposing bare optical fiber at the end of the optical fiber;
    inserting the end of the optical fiber into a second end of the lock nut such that the bare optical fiber passes into the package body and at least a portion of the bare optical fiber inserts into a cavity of the TO can; and
    dispensing glue into a third cavity of the package body to environmentally seal the bare optical fiber.

2. The method of claim 1, wherein the TO can is a hermetically sealed TO can.

3. The method of claim 1, wherein the TO can comprises a lens.

4. The method of claim 1, wherein the OSA is tilted approximately thirty (30) degrees from a plane of a mounting surface for the OSA.

5. The method of claim 1, wherein the method further comprises:
    securing, with at least one screw, a bottom side of the OSA to a mounting surface of a board by screwing the at least one screw through an opening in the board into a mounting screw hole on the bottom side of the OSA, thereby mounting the OSA to the board.

6. The method of claim 5, wherein the board is an optical media converter (OMC) printed circuit board (PCB).

7. The method of claim 1, wherein the OSA is an optical transmitter.

8. The method of claim 1, wherein the OSA is an optical receiver.

9. The method of claim 1, wherein the optical fiber, including the jacket, has a diameter of approximately 1.5 millimeters (mm) to approximately 2.2 mm.

10. The method of claim 1, wherein the bare optical fiber, without the jacket, has a diameter of approximately 1 millimeter (mm).

11. The method of claim 1, wherein the glue is a military specification (mil-spec) grade epoxy.

12. The method of claim 1, wherein the method further comprises inserting glue into the second end of the lock nut to secure the lock nut to the package body.

13. The method of claim 1, wherein the method further comprises manufacturing the package body by molding the package body from a cool polymer material.

14. An apparatus for an optical sub-assembly (OSA), the apparatus comprising:
- a package body;
- a lock nut, wherein a first end of the lock nut is inserted into a first cavity of the package body;
- a transistor outline (TO) can, wherein a first end of the TO can is inserted into a second cavity of the package body; and
- an optical fiber, wherein a portion of a jacket from an end of the optical fiber is stripped off, thereby exposing bare optical fiber at the end of the optical fiber, wherein the end of the optical fiber is inserted into a second end of the lock nut such that the bare optical fiber passes into the package body and at least a portion of the bare optical fiber is inserted into a cavity of the TO can, and wherein glue is dispensed into a third cavity of the package body, thereby environmentally sealing the bare optical fiber.

15. The apparatus of claim 14, wherein the TO can is hermetically sealed.

16. The apparatus of claim 14, wherein the TO can comprises a lens.

17. The apparatus of claim 14, wherein the OSA is tilted approximately thirty (30) degrees from a plane of a mounting surface for the OSA.

18. The apparatus of claim 14, wherein the OSA is an optical transmitter.

19. The apparatus of claim 14, wherein the OSA is an optical receiver.

20. The apparatus of claim 14, wherein the package body is manufactured from a molded cool polymer material.

\* \* \* \* \*